US011974361B2

(12) United States Patent
Li et al.

(10) Patent No.: US 11,974,361 B2
(45) Date of Patent: Apr. 30, 2024

(54) PARENTAL CONTROL BASED UPON DETECTION OF MOBILE DEVICE (71) Applicant: ARRIS ENTERPRISES LLC, Suwanee, GA (US)

(72) Inventors: Ju Li, Shenzhen (CN); Dongting Zhang, Shenzhen (CN); Xiangzhong Jiao, Shenzhen (CN); Bo Chen, Shenzhen (CN); Yuanhai Tang, Shenzhen (CN)

(73) Assignee: ARRIS Enterprises LLC, Horsham, PA (US)

( * ) Notice: Subject to any disclaimer, the term of this patent is extended or adjusted under 35 U.S.C. 154(b) by 385 days.

(21) Appl. No.: 17/602,163

(22) PCT Filed: Apr. 8, 2019

(86) PCT No.: PCT/CN2019/081760
§ 371 (c)(1),
(2) Date: Oct. 7, 2021

(87) PCT Pub. No.: WO2020/206592
PCT Pub. Date: Oct. 15, 2020

(65) Prior Publication Data
US 2022/0167149 A1 May 26, 2022

(51) Int. Cl.
*H04W 8/24* (2009.01)
(52) U.S. Cl.
CPC .................... *H04W 8/24* (2013.01)
(58) Field of Classification Search
None
See application file for complete search history.

(56) References Cited

U.S. PATENT DOCUMENTS 6,567,979 B1 * 5/2003 deCarmo ......... H04N 21/25891
725/28
8,611,928 B1 * 12/2013 Bill ....................... H04W 48/04
455/414.3

(Continued)

FOREIGN PATENT DOCUMENTS

CN         1947419 A      4/2007
CN       101795198 A      8/2010
(Continued)

OTHER PUBLICATIONS

PCT Search Report and Written Opinion in International Application No. PCT/CN2019/081760, dated Dec. 30, 2019 10 pages.

*Primary Examiner* — Adam D Houston
(74) *Attorney, Agent, or Firm* — Panitch Schwarze Belisario & Nadel LLC (57) ABSTRACT

Methods, systems, and computer readable media can be operable to facilitate management of parental control settings at one or more devices based upon a detection of a control device. A central device (115) may be configured with one or more device identifiers of one or more devices that are designated as control devices. In response to a determination by the central device (115) that no control device is connected to the central device (115), the central device (115) may enable one or more parental control settings at the central device (115) and/or one or more client devices (105). When the central device (115) determines that a control device is connected to the central device (115), the central device (115) may disable one or more parental control settings at the central device (115) and/or one or more client devices (105).

20 Claims, 7 Drawing Sheets

(56) References Cited

U.S. PATENT DOCUMENTS

| | | | | |
|---|---|---|---|---|
| 9,824,248 | B2* | 11/2017 | Sheng | H04W 4/026 |
| 10,078,762 | B1* | 9/2018 | Gu | H04N 21/4542 |
| 10,264,458 | B2* | 4/2019 | Dorfman | H04W 12/08 |
| 10,382,488 | B1* | 8/2019 | Gu | H04L 65/612 |
| 10,986,395 | B2* | 4/2021 | Wei | H04N 21/4222 |
| 11,108,826 | B2* | 8/2021 | Gandhi | H04W 12/088 |
| 2005/0102407 | A1 | 5/2005 | Clapper | |
| 2011/0061109 | A1* | 3/2011 | Austin | H04N 21/4753 |
| | | | | 726/27 |
| 2015/0012943 | A1* | 1/2015 | Mampaey | H04N 21/812 |
| | | | | 725/39 |
| 2019/0182527 | A1* | 6/2019 | Sharma | H04N 21/4542 |
| 2021/0144150 | A1* | 5/2021 | James | H04W 12/08 |
| 2022/0167149 | A1* | 5/2022 | Li | G06F 21/35 |
| 2022/0217151 | A1* | 7/2022 | Li | H04L 63/105 |
| 2023/0037411 | A1* | 2/2023 | Gonzalez | H04N 21/4751 |
| 2023/0379338 | A1* | 11/2023 | James | H04W 4/029 |

FOREIGN PATENT DOCUMENTS

| | | | | |
|---|---|---|---|---|
| CN | 105490952 A | | 4/2016 | |
| CN | 106412896 A | | 2/2017 | |
| WO | WO-2013096950 A1 | * | 6/2013 | H04W 12/08 |
| WO | WO-2020206592 A1 | * | 10/2020 | G06F 21/35 |

\* cited by examiner

PARENTAL CONTROL BASED UPON DETECTION OF MOBILE DEVICE

CROSS-REFERENCE TO RELATED APPLICATION

The present application is a national phase entry under 35 U.S.C. § 371 of International Application No. PCT/CN2019/081760, filed Apr. 8, 2019, published as International Publication No. WO 2020/206592 A1, the disclosure of which is incorporated herein by reference.

TECHNICAL FIELD

This disclosure relates to an implementation of parental controls based upon detection of a mobile device.

BACKGROUND

A central device, such as a gateway, cable modem, multimedia terminal adapter (MTA), or embedded MTA (EMTA) may be used at a customer premise to route communications between subscriber/client devices and one or more upstream networks. Typically, the central device can be used to provide multiple services to a user such as video, data, and/or voice services. Thus, the central device may receive most of, if not all communications entering and exiting the subscriber premise.

Harassing phone calls may create a danger when one or more individuals are at a subscriber premise without an adult (e.g., parent, guardian, caretaker, etc.) being present. Without an adult present, an individual may be tricked by a caller into giving out sensitive information or making a purchase. Further, when an adult is not present, an individual may attempt to misuse one or more client devices (e.g., set-top box, computer, mobile device, tablet, etc.) that are connected to a local network. Therefore, it is desirable to improve upon methods and systems for enabling parental control settings (e.g., call blocking) when an adult is not present within a subscriber premise.

BRIEF DESCRIPTION OF THE DRAWINGS

Like reference numbers and designations in the various drawings indicate like elements.

DETAILED DESCRIPTION

It is desirable to improve upon methods and systems for enabling parental control settings when an adult is not present within a subscriber premise. Methods, systems, and computer readable media can be operable to facilitate management of parental control settings at one or more devices based upon a detection of a control device. A central device may be configured with one or more device identifiers of one or more devices that are designated as control devices. In response to a determination by the central device that no control device is connected to the central device, the central device may enable one or more parental control settings at the central device and/or one or more client devices. When the central device determines that a control device is connected to the central device, the central device may disable one or more parental control settings at the central device and/or one or more client devices.

Figure 1:
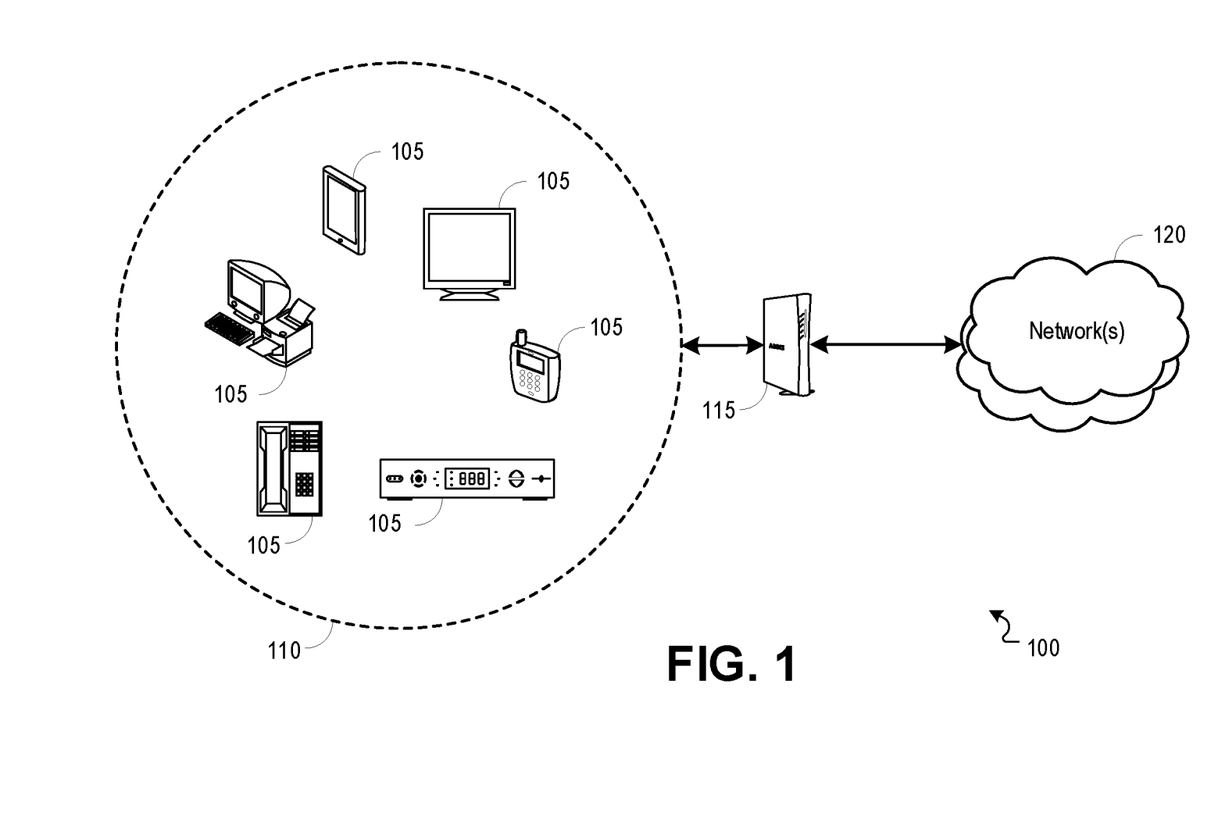
FIG. 1 is a block diagram illustrating an example network environment operable to facilitate management of parental control settings at one or more devices based upon a detection of a control device.

FIG. 1 is a block diagram illustrating an example network environment 100 operable to facilitate management of parental control settings at one or more devices based upon a detection of a control device. In embodiments, video, voice, and/or data services may be delivered to one or more client devices 105 over one or more signal paths. Client devices 105 may include a television, mobile device, tablet, computer, set-top box (STB), telephone, gaming device, wearable device, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR content), audio-only content, streaming content, telephony services, and others. It should be further understood that the devices shown in FIG. 1 may be integrated. For example, a television may be connected to and controlled by a STB.

Multiple services may be delivered to client devices 105 over one or more local networks 110. The local network(s) 110 may include a local area network (LAN), wireless local area network (WLAN), personal area network (PAN), Multimedia over Coax Alliance (MoCA) network, mobile hotspot network, and others. The local network 110 may be provided at a subscriber premise by a central device 115. The central device 115 may include any device configured to facilitate communications between an upstream network and one or more client devices 105, such as a modem, multimedia terminal adapter (MTA), embedded MTA (EMTA), gateway device, or other access device. The central device 115 may be integrated with other devices. For example, the central device 115 may include a modem (e.g., a modem may reside within a gateway device, STB, or other devices). It should be understood that delivery of the multiple services over the local network(s) 110 may be accomplished using a variety of standards and formats. It will be appreciated by those skilled in the relevant art that client devices 105 may be capable of interacting and communicating with each other and/or with a central device 115 over various wireless communication standards (e.g., Wi-Fi, Bluetooth, etc.).

In embodiments, the central device 115 may route communications between one or more client devices 105 and one or more user devices located outside of the area serviced by the one or more local networks 110 over one or more networks 120 (e.g., an Internet protocol (IP) network). For example, communications targeted for a user device may be routed through one or more networks 120 to the targeted user device. User devices may include mobile devices, tablets, computers, IP telephony devices, and any other device configured to receive communications via a connection to an IP network.

In embodiments, the central device 115 may provide one or more telephony lines wherein each line may be used to establish a communication session between one or more client devices 105 and one or more user devices located outside of the area serviced by the one or more local networks 110. For example, the central device 115 may establish a session between one or more client devices 105 and one or more user devices through a network 120 (e.g., a voice network). User devices may include telephony devices configured to receive communications via a connection to the voice network. It should be understood that a session may be established by routing communications from an IP network to a voice network (e.g., at an upstream switching or gateway device). It will be appreciated by those skilled in the relevant art that a voice network may be a public switched telephone network (PSTN), cellular or mobile network (e.g., 2G, 3G, etc.), a satellite network, or any other network operable to route voice communications.

In embodiments, the central device 115 may be configured with one or more device identifiers that are associated with one or more control devices. For example, a control device may be a device (e.g., mobile device, wearable device, etc.) that is associated with an individual designated as having control or authority within a premise (e.g., an adult, guardian, caretaker, etc.). A device identifier associated with a control device may be a MAC (media access control) address or other unique identifiers associated with the control device. A user may configure the central device 115 with the one or more device identifiers associated with the one or more control devices through a GUI output from the central device 115 to a display device connected to or otherwise associated with the central device 115.

In embodiments, the central device 115 may monitor one or more devices that are within a certain range of the central device 115. The central device 115 may detect a connection and/or disconnection of a client device 105 from the local network 110 that is provided by the central device 115. The central device 115 may identify a device identifier (e.g., a MAC address) of a client device 115 that joins the local network 110 or that otherwise communicates with the central device 115. The central device 115 may continuously or periodically monitor one or more client devices 105 that are designated as control devices. The central device 115 may determine whether at least one control device is connected to the central device 115 or to a network that is provided by the central device 115. For example, control devices may be connected to the central device 115 via a wireless connection (e.g., Wi-Fi connection), and the central device 115 may continuously or periodically determine a connection status of each of the one or more control devices.

In embodiments, when each of one or more control devices is disconnected from the central device 115 for a predetermined duration, the central device 115 may enable parental control settings at the central device 115 and/or at one or more client devices 105. For example, the central device 115 may block incoming calls. The central device 115 may be configured with one or more trusted numbers, wherein an incoming call from a trusted number is accepted while parental control settings are enabled. The central device 115 may output communications to one or more client devices 105, wherein the communications instruct the one or more client devices 105 to enable one or more parental control settings. The enabled parental control settings may include MAC (media access control) filtering. For example, the central device 115 may be configured with one or more MAC addresses associated with one or more devices (e.g., client devices 105) that are to be blocked by the central device 115 when parental control settings are enabled. When parental control settings are enabled, the central device 115 may utilize MAC filtering to preclude devices associated with the configured MAC addresses from accessing a network provided by the central device 115. The enabled parental control settings may include content blocking such as a firewall. For example, the central device 115 may be configured with content or websites (e.g., URL (uniform resource locator)) that are to be blocked when parental control settings are enabled. The central device 115 may preclude access to the configured content or websites while parental control settings are enabled. It should be appreciated that the enabled parental control settings may include a variety of other device or network settings.

In embodiments, while parental control settings are enabled, the central device 115 may disable the parental control settings when the central device 115 detects a connection of a control device to the local network 110 or when the central device 115 otherwise detects a communication from a control device. The central device 115 may disable one or more parental control settings that are enabled at the central device 115, and/or the central device 115 may output communications to one or more client devices 105, the communications instructing the one or more client devices 105 to disable one or more parental control settings.

Figure 2:
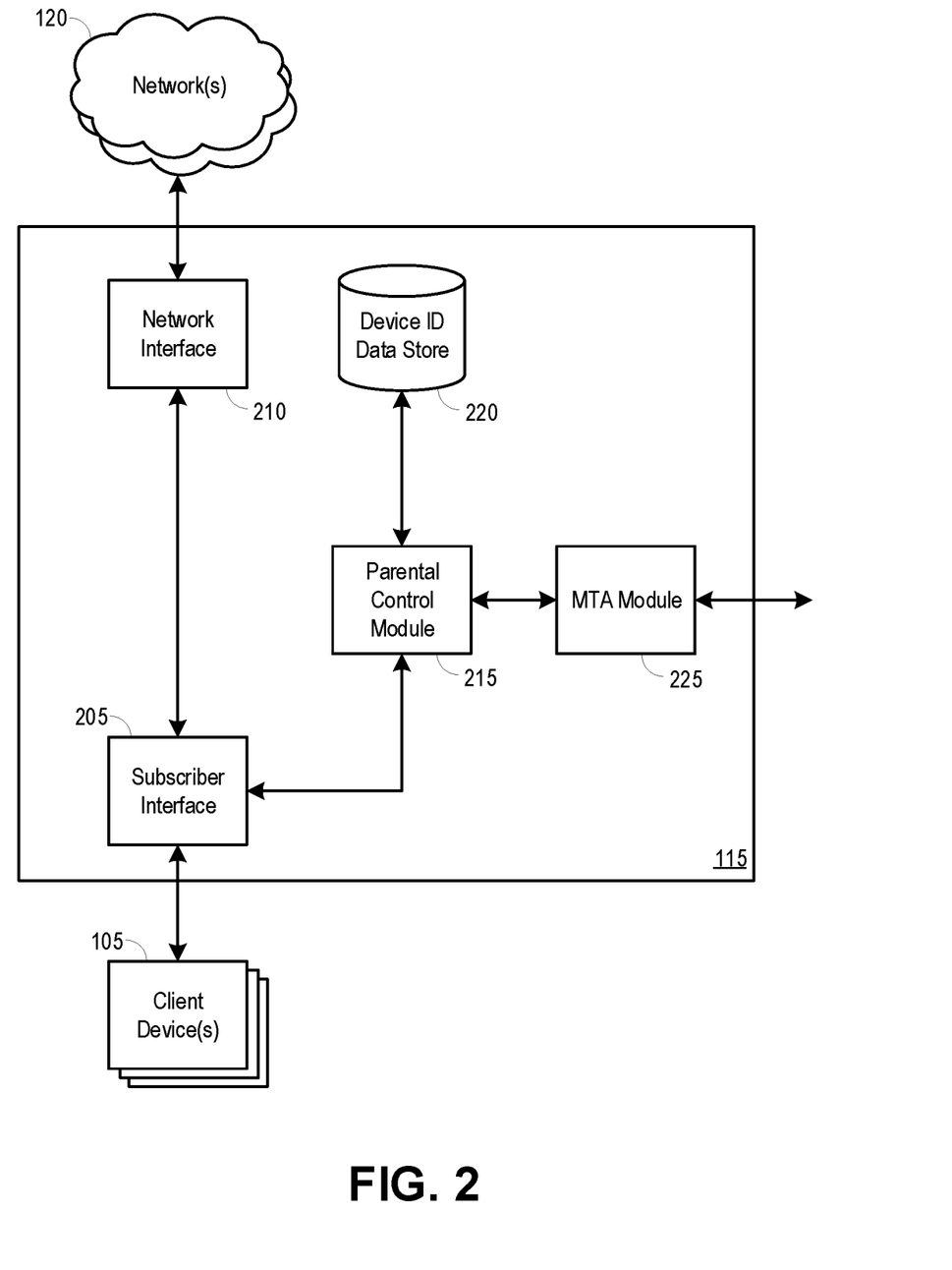
FIG. 2 is a block diagram illustrating an example central device operable to facilitate management of parental control settings at one or more devices based upon a detection of a control device.

FIG. 2 is a block diagram illustrating an example central device 115 operable to facilitate management of parental control settings at one or more devices based upon a detection of a control device. The central device 115 may include a subscriber interface 205, a network interface 210, a parental control module 215, a device ID (identifier) data store 220, and a MTA (multimedia terminal adapter) module 225. In embodiments, the central device 115 may be a modem and can operate as a standalone device or can be integrated with other devices such as a gateway device, MTA, STB, or others.

In embodiments, communications may be output to and/or received from one or more client devices 105 through one or more subscriber interfaces 205. Data, video, and/or voice communications may be output from and/or received through the one or more subscriber interfaces 205. It should be understood that a subscriber interface 205 may be configured to receive and/or output communications using various communication techniques, protocols, and standards (e.g., Ethernet, Wi-Fi, Multimedia over Coax Alliance (MoCA), twisted pair, etc.). The subscriber interface 205 may include a line card or any other component configured to connect the central device 115 with a telephony device.

In embodiments, communications may be output to and/or received from one or more network(s) 120 through one or more network interfaces 210.

In embodiments, the parental control module 215 may receive user input designating one or more client devices 105 as control devices associated with the central device 115. For example, the parental control module 215 may generate a graphical user interface (GUI) that is configured to prompt a user to input information associated with one or more client devices 105 that are to be designated as control devices, and the GUI may be output to a display through the subscriber interface 205. Using the GUI, or any other means for configuring the central device 115, a user may input a unique identifier associated with one or more client devices 105 that are to be designated as control devices. For example, the unique identifier may be an entry of an identifier (e.g., name of device, MAC address of the device, etc.) or a selection of a client device 105 that is presented to a user within the GUI. A control device may be a device (e.g., mobile device, wearable device, etc.) that is associated with an individual designated as having control or authority within a premise (e.g., an adult, guardian, caretaker, etc.). The one or more unique identifiers of the one or more control devices may be stored at the device ID data store 220.

In embodiments, the central device 115 may monitor one or more devices that are within a certain range of the central device 115. The central device 115 (e.g., the parental control module 215) may detect a connection and/or disconnection of a client device 105 from a local network (e.g., local network 110 of FIG. 1) that is provided by the central device 115. The parental control module 215 may identify a device identifier (e.g., a MAC address) of a client device 115 that joins the local network 110 or that otherwise communicates with the central device 115.

In embodiments, when each of one or more control devices is disconnected from the central device 115 for a predetermined duration, the parental control module 215 may enable parental control settings at the central device 115 and/or at one or more client devices 105. For example, in response to the determination that the control device(s) are disconnected from the central device 115, the parental control module 215 may signal the MTA module 225 to block incoming calls. The MTA module 225 may be configured with one or more trusted numbers, wherein an incoming call from a trusted number is accepted while parental control settings are enabled. In response to the determination that the control device(s) are disconnected from the central device 115, the parental control module 215 may output communications to one or more client devices 105, wherein the communications instruct the one or more client devices 105 to enable one or more parental control settings.

In embodiments, while parental control settings are enabled, the parental control module 215 may disable the parental control settings when the parental control module 215 detects a connection of a control device to the local network 110 or when the parental control module 215 otherwise detects a communication from a control device. The parental control module 215 may disable one or more parental control settings that are enabled at the central device 115, and/or the parental control module 215 may output communications to one or more client devices 105, the communications instructing the one or more client devices 105 to disable one or more parental control settings.

Figure 3:
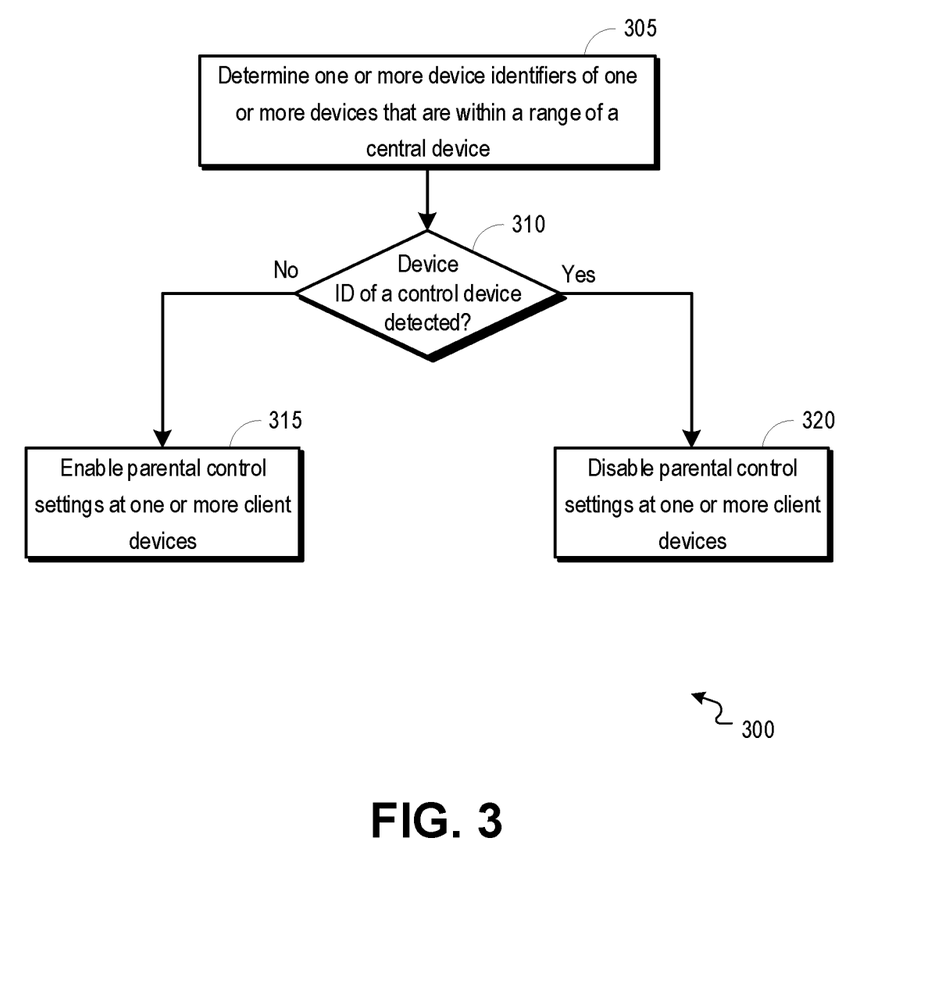
FIG. 3 is a flowchart illustrating an example process operable to facilitate management of parental control settings at one or more devices based upon a detection of a control device.

FIG. 3 is a flowchart illustrating an example process 300 operable to facilitate management of parental control settings at one or more devices based upon a detection of a control device. The process 300 can begin at 305, when one or more device identifiers of one or more devices (e.g., client devices 105 of FIG. 1) that are within a range of a central device (e.g., central device 115 of FIG. 1) are determined. The one or more device identifiers of the one or more devices that are within a range of the central device 115 may be determined, for example by the central device 115 (e.g., by a parental control module 215 of FIG. 2). In embodiments, the central device 115 may determine the one or more device identifiers periodically or in response to a triggering event. For example, the triggering event may be a determination by the central device 115 that a device has disconnected from the central device 115 (e.g., disconnected from a local network provided by the central device 115) or otherwise broken communications with the central device 115, or that a device has connected to the central device 115 (e.g., joined a local network provided by the central device 115) or otherwise initiated communications with the central device 115. The device identifiers may include a unique identifier (e.g., MAC address, etc.) associated with each of the one or more client devices 105 that are within the range of the central device, and the device identifier for each respective client device 105 may be retrieved by the central device 115 from a communication that is received by the central device 115 from the respective client device 105.

At 310, a determination may be made whether a device identifier associated with a control device is detected among the one or more device identifiers of the one or more devices that are within the range of the central device 115 (e.g., the one or more device identifiers determined at 305). The determination whether a device identifier associated with a control device is detected among the determined one or more device identifiers may be made, for example, by the central device 115. In embodiments, the central device 115 may compare one or more device identifiers of one or more control devices to the one or more device identifiers of the one or more devices that are within the range of the central device 115. The central device 115 may be configured with the one or more device identifiers (e.g., MAC address) of the one or more control devices. For example, the one or more device identifiers of the one or more control devices may be stored at the central device 115 (e.g., stored at a device ID data store 220 of FIG. 2).

If, at 310, the determination is made that no device identifier associated with a control device is detected, the process 300 may proceed to 315. At 315, parental control settings may be enabled at one or more client devices. The parental control settings may be enabled at the one or more client devices, for example, by the central device 115 (e.g., by the parental control module 215 of FIG. 2). In embodiments, the parental control module 215 may output communications to one or more modules or external devices (e.g., client devices 105), wherein the communications include instructions to enable one or more parental control settings. For example, the parental control module 215 may output a communication to a MTA module 225 of FIG. 2, wherein the communication instructs the MTA module 225 to block incoming calls. In response, the MTA module 225 may block all incoming calls except for incoming calls that are received from a trusted number, wherein the MTA module 225 is configured with one or more trusted numbers. The enabled parental control settings may include MAC (media access control) filtering. For example, the central device 115 may be configured with one or more MAC addresses associated with one or more devices (e.g., client devices 105) that are to be blocked by the central device 115 when parental control settings are enabled. When parental control settings are enabled, the central device 115 may utilize MAC filtering to preclude devices associated with the configured MAC addresses from accessing a network provided by the central device 115. The enabled parental control settings may include content blocking such as a firewall. For example, the central device 115 may be configured with content or websites (e.g., URL (uniform resource locator)) that are to be blocked when parental control settings are enabled. The central device 115 may preclude access to the configured content or websites while parental control settings are enabled. It should be appreciated that the enabled parental control settings may include a variety of other device or network settings.

If, at 310, the determination is made that one or more device identifiers associated with one or more control devices are detected, the process 300 may proceed to 320. At 320, parental control settings may be disabled at one or more client devices. The parental control settings may be disabled at the one or more client devices, for example, by the central device 115 (e.g., by the parental control module 215 of FIG. 2). In embodiments, the parental control module 215 may output communications to one or more modules or external devices (e.g., client devices 105), wherein the communications include instructions to disable one or more parental control settings. For example, the parental control module 215 may output a communication to a MTA module 225 of FIG. 2, wherein the communication instructs the MTA module 225 to allow incoming calls to be received. In response, the MTA module 225 may trigger a switch that allows incoming calls from numbers other than trusted-numbers to be received.

Figure 4:
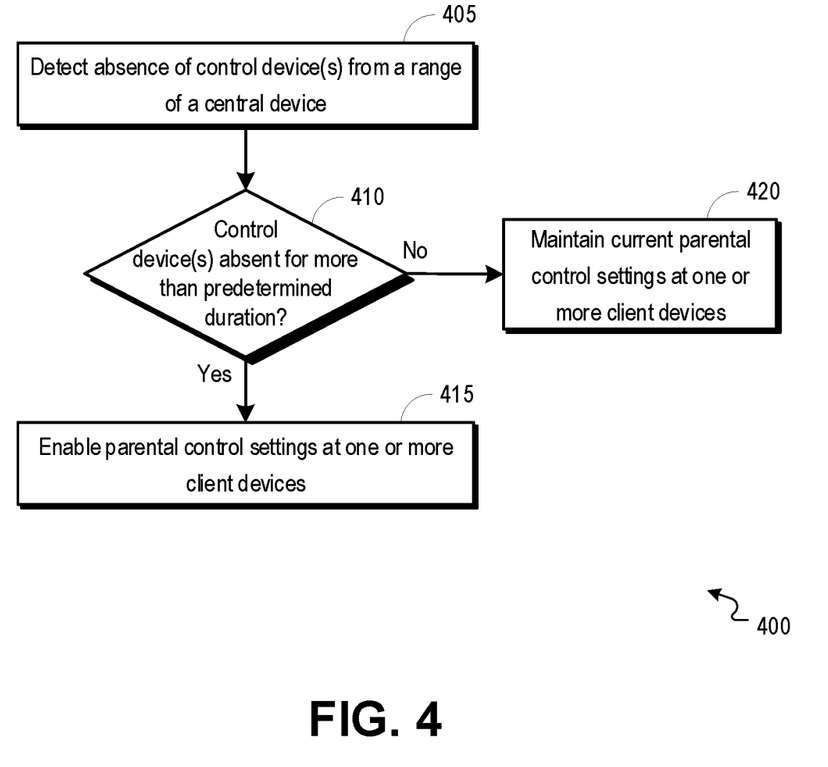
FIG. 4 is a flowchart illustrating an example process operable to facilitate the enabling of parental control settings based upon a detected absence of a control device from a range of a central device.

FIG. 4 is a flowchart illustrating an example process 400 operable to facilitate the enabling of parental control settings based upon a detected absence of a control device from a range of a central device. The process 400 can begin at 405, when an absence of control device(s) from a range of a central device is detected. The absence of a control device may be detected, for example, by a central device 115 of FIG. 1 (e.g., by a parental control module 215 of FIG. 2). A control device may be a client device 105 of FIG. 1 that is designated as a control device at the central device 115. The central device 115 may be configured with one or more device identifiers of one or more client devices 105 that are designated as control devices. In embodiments, when the central device 115 determines that a device has disconnected from the central device 115 (e.g., disconnected from a local network provided by the central device 115) or otherwise broken communications with the central device 115, the central device 115 may determine whether any of one or more control devices are connected to the central device 115. For example, the central device 115 may determine one or more device identifiers associated with one or more client devices 105 that are connected to the central device 115, and if no device identifiers associated with a control device are detected, the central device 115 may determine that no control device is connected to the central device 115. While a control device is connected to the central device 115, the control device and central device 115 may periodically exchange heartbeat messages. The central device 115 may determine that a control device has left the range of the central device 115 in response to a determination by the central device 115 that the central device 115 is no longer receiving heartbeat messages, or similar signals or communications, from the control device.

At 410, a determination may be made whether the control device(s) are absent from the range of the central device for more than a predetermined duration. The determination whether the control device(s) are absent from the range of the central device for more than a predetermined duration may be made, for example, by the central device 115 (e.g., by the parental control module 215). In embodiments, when the central device 115 detects the absence of the control device(s) from the range of the central device 115, the central device 115 may initiate a timer set for the predetermined duration. At the expiration of the timer, the central device 115 may check the device identifiers of one or more client devices 105 that are connected to the central device 115, and if the device identifier(s) of the one or more control devices are still missing from the device identifiers of the client device(s) 105 that are connected to the central device 115, the central device 115 may make the determination that the control device(s) have been absent from the range of the central device for more than the predetermined duration.

If, at 410, the determination is made that the control device(s) have been absent from the range of the central device for more than the predetermined duration, the process 400 may proceed to 415. At 415, parental control settings may be enabled at one or more client devices. The parental control settings may be enabled at the one or more client devices, for example, by the central device 115 (e.g., by the parental control module 215 of FIG. 2). In embodiments, the parental control module 215 may output communications to one or more modules or external devices (e.g., client devices 105), wherein the communications include instructions to enable one or more parental control settings. For example, the parental control module 215 may output a communication to a MTA module 225 of FIG. 2, wherein the communication instructs the MTA module 225 to block incoming calls. In response, the MTA module 225 may block all incoming calls except for incoming calls that are received from a trusted number, wherein the MTA module 225 is configured with one or more trusted numbers.

If, at 410, the determination is made that the control device(s) have not been absent from the range of the central device for more than the predetermined duration (i.e., the central device detects a device identifier of a control device among the one or more device identifiers of the one or more client devices that are determined to be connected to the central device at 410), the process 400 may proceed to 420. At 420, current parental control settings at one or more client devices may be maintained. In embodiments, the central device 115 may allow a current status (e.g., enabled or disabled) of one or more parental control settings to be maintained at one or more internal devices or modules (e.g., MTA module 225) and/or external devices (e.g., client devices 105).

Figure 5:
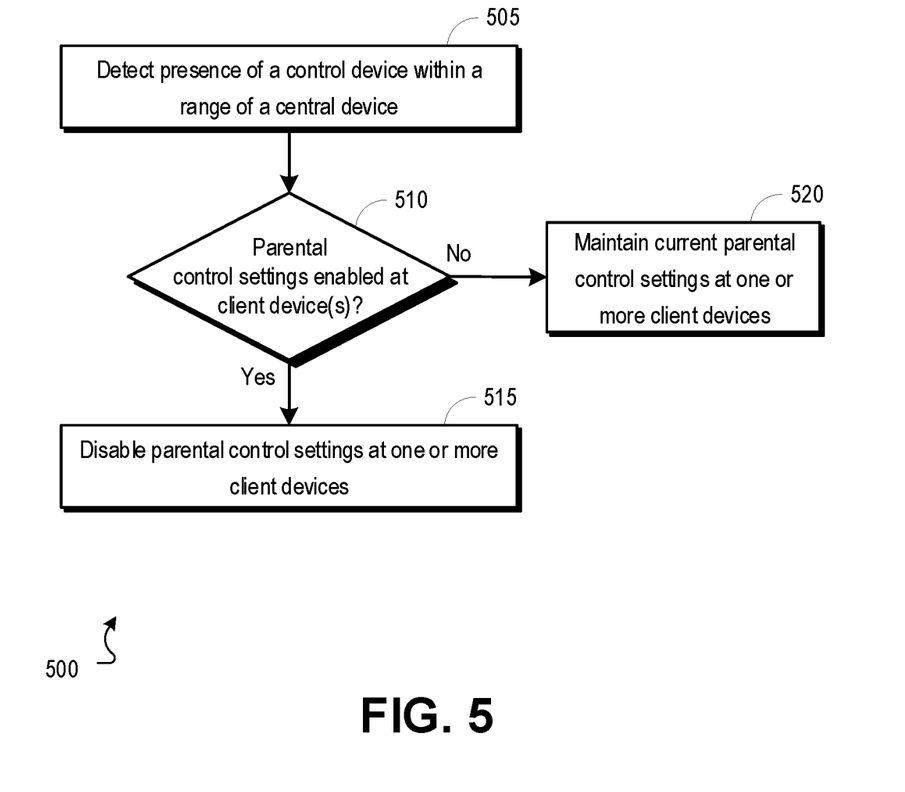
FIG. 5 is a flowchart illustrating an example process operable to facilitate the disabling of parental control settings based upon a detected presence of a control device within a range of a central device.

FIG. 5 is a flowchart illustrating an example process 500 operable to facilitate the disabling of parental control settings based upon a detected presence of a control device within a range of a central device. The process 500 can begin at 505, when a presence of a control device within a range of a central device is detected. The presence of a control device may be detected, for example, by a central device 115 of FIG. 1 (e.g., by a parental control module 215 of FIG. 2). A control device may be a client device 105 of FIG. 1 that is designated as a control device at the central device 115. The central device 115 may be configured with one or more device identifiers of one or more client devices 105 that are designated as control devices. In embodiments, when the central device 115 determines that a device has connected to the central device 115 (e.g., connected to a local network provided by the central device 115) or otherwise initiated communications with the central device 115, the central device 115 may determine whether any of one or more control devices are connected to the central device 115. For example, the central device 115 may determine one or more device identifiers associated with one or more client devices 105 that are connected to the central device 115, and if a device identifier associated with a control device is detected, the central device 115 may determine that a control device is connected to the central device 115. In embodiments, a control device may connect to the central device 115 via a wireless connection (e.g., Wi-Fi). During the process of connecting the control device to the central device 115, a series of communications (e.g., DHCP (dynamic host configuration protocol) messages) may be passed between the control device and the central device 115, and the series of communications may include a device identifier associated with the control device. The central device 115 may detect the presence or connection of a control device based upon an identification by the central device 115 of a device identifier associated with the control device, wherein the device identifier is identified from a communication received by the central device 115 from the control device (e.g., from a DHCP message, a heartbeat message received after connection of the control device to the central device 115, or other signal or communication).

At 510, a determination may be made whether parental control settings are enabled at one or more devices. The determination whether parental control settings are enabled at one or more devices may be made, for example, by the central device 115 (e.g., by the parental control module 215). In embodiments, the parental control module 215 may determine whether parental control settings are currently enabled at the central device 115 or client devices 105 that are connected to the central device 115 as a result of a previous determination that no control devices were within the range of the central device 115.

If, at 510, the determination is made that parental control settings are enabled at one or more client devices, the process 500 may proceed to 515. At 515, parental control settings may be disabled at one or more client devices. The parental control settings may be disabled at the one or more client devices, for example, by the central device 115 (e.g., by the parental control module 215). In embodiments, the parental control module 215 may output communications to one or more modules or external devices (e.g., client devices 105), wherein the communications include instructions to disable one or more parental control settings that were in enabled in response to a determination that no control device was detected within the range of the central device. For example, the parental control module 215 may output a communication to a MTA module 225 of FIG. 2, wherein the communication instructs the MTA module 225 to activate a switch that allows incoming calls. In response, the MTA module 225 may allow all incoming calls to be received. For example, the MTA module 225 may allow incoming calls to be received from trusted numbers and incoming calls from numbers that are not designated as trusted numbers.

If, at 510, the determination is made that parental control settings are not enabled at one or more client devices, the process 500 may proceed to 520. At 520, current parental control settings at one or more client devices may be maintained. In embodiments, the central device 115 may allow a current status (e.g., enabled or disabled) of one or more parental control settings to be maintained at one or more internal devices or modules (e.g., MTA module 225) and/or external devices (e.g., client devices 105).

Figure 6:
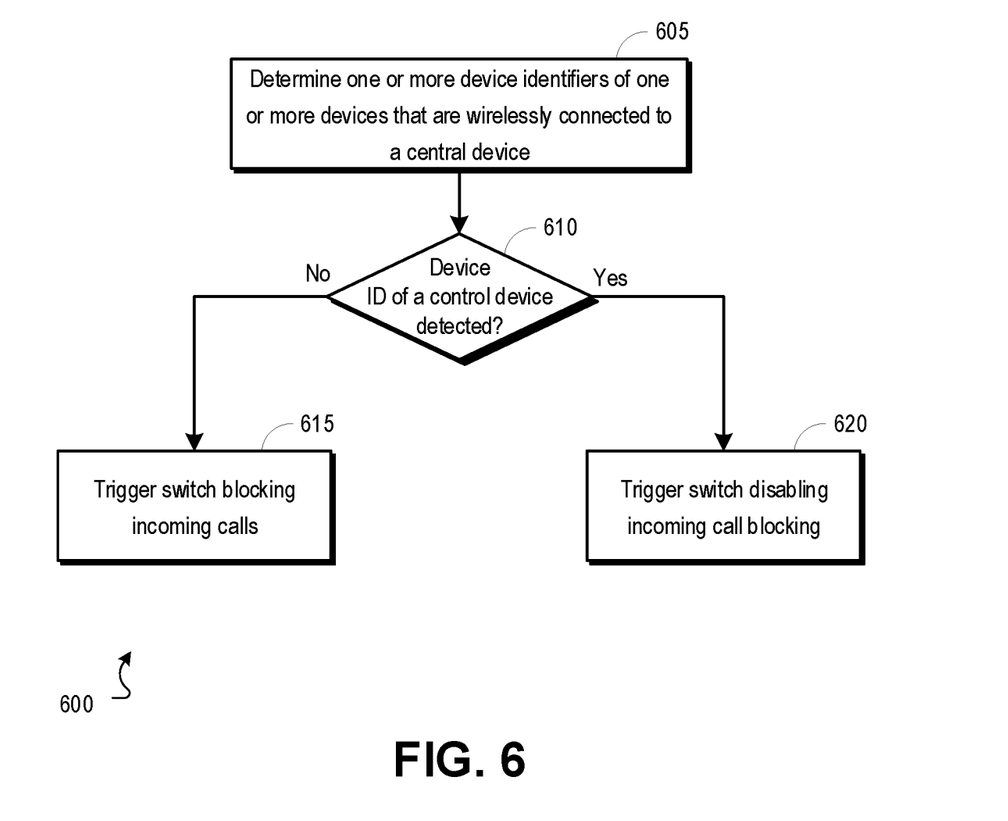
FIG. 6 is a flowchart illustrating an example process operable to facilitate management of a call blocking setting at one or more devices based upon a detection of a control device.

FIG. 6 is a flowchart illustrating an example process 600 operable to facilitate management of a call blocking setting at one or more devices based upon a detection of a control device. The process 600 can begin at 605, when one or more device identifiers of one or more devices (e.g., client devices 105 of FIG. 1) that are within a range of a central device (e.g., central device 115 of FIG. 1) are determined. The one or more device identifiers of the one or more devices that are within a range of the central device 115 may be determined, for example by the central device 115 (e.g., by a parental control module 215 of FIG. 2). In embodiments, the central device 115 may determine the one or more device identifiers periodically or in response to a triggering event. For example, the triggering event may be a determination by the central device 115 that a device has disconnected from the central device 115 (e.g., disconnected from a local network provided by the central device 115) or otherwise broken communications with the central device 115, or that a device has connected to the central device 115 (e.g., joined a local network provided by the central device 115) or otherwise initiated communications with the central device 115. The device identifiers may include a unique identifier (e.g., MAC address, etc.) associated with each of the one or more client devices 105 that are within the range of the central device, and the device identifier for each respective client device 105 may be retrieved by the central device 115 from a communication that is received by the central device 115 from the respective client device 105.

At 610, a determination may be made whether a device identifier associated with a control device is detected among the one or more device identifiers of the one or more devices that are within the range of the central device 115 (e.g., the one or more device identifiers determined at 305). The determination whether a device identifier associated with a control device is detected among the determined one or more device identifiers may be made, for example, by the central device 115. In embodiments, the central device 115 may compare one or more device identifiers of one or more control devices to the one or more device identifiers of the one or more devices that are within the range of the central device 115. The central device 115 may be configured with the one or more device identifiers (e.g., MAC address) of the one or more control devices. For example, the one or more device identifiers of the one or more control devices may be stored at the central device 115 (e.g., stored at a device ID data store 220 of FIG. 2).

If, at 610, the determination is made that no device identifier associated with a control device is detected, the process 600 may proceed to 615. At 615, a switch may be triggered to block incoming calls. In embodiments, a parental control module 215 of FIG. 2 may output communications to a MTA module 225 of FIG. 2, wherein the communication instructs the MTA module 225 to block incoming calls. In response, the MTA module 225 may block all incoming calls except for incoming calls that are received from a trusted number, wherein the MTA module 225 is configured with one or more trusted numbers.

If, at 610, the determination is made that one or more device identifiers associated with one or more control devices are detected, the process 600 may proceed to 620. At 620, a switch may be triggered to disable incoming call blocking. In embodiments, the parental control module 215 may output communications to the MTA module 225, wherein the communication instructs the MTA module 225 to allow incoming calls to be received. In response, the MTA module 225 may trigger a switch that allows incoming calls from numbers other than trusted-numbers to be received.

Figure 7:
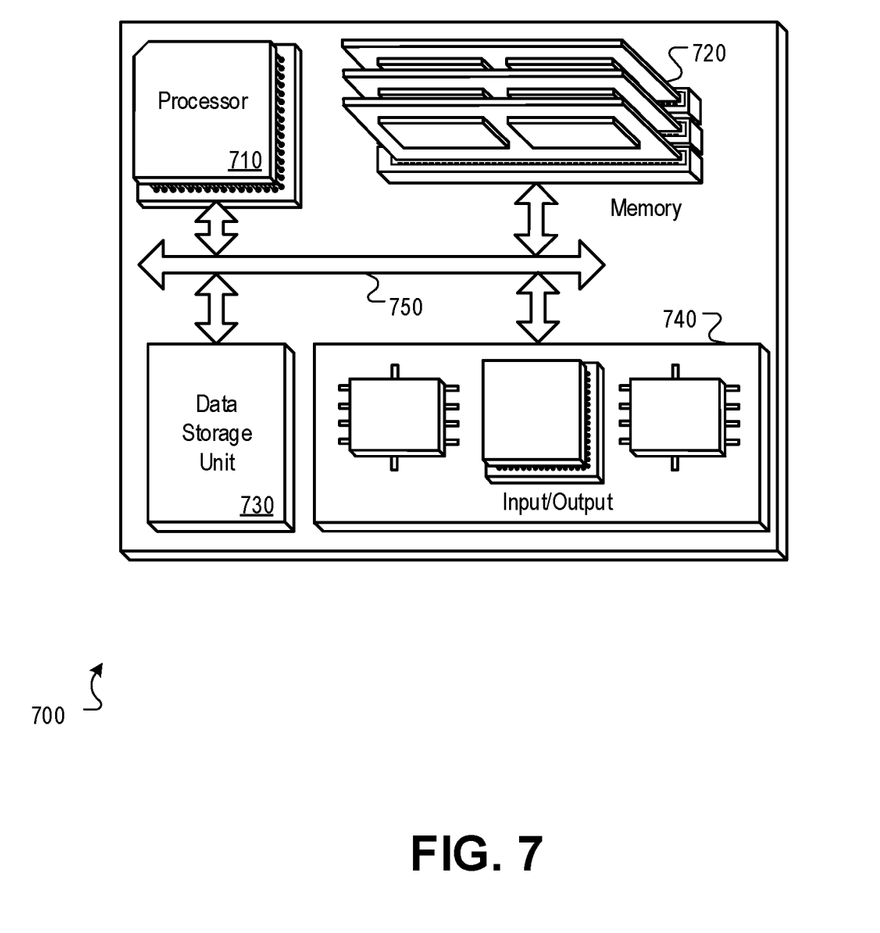
FIG. 7 is a block diagram of a hardware configuration operable to facilitate management of parental control settings at one or more devices based upon a detection of a control device.

FIG. 7 is a block diagram of a hardware configuration 700 operable to facilitate management of parental control settings at one or more devices based upon a detection of a control device. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor.

The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a client device 105 of FIG. 1 (e.g., television, STB, computer, mobile device, tablet, telephone, wearable, etc.). In embodiments, the input/output device can include driver devices configured to send communications to, and receive communications from one or more networks (e.g., local network 110, network(s) 120, etc.).

Those skilled in the art will appreciate that the invention improves upon methods and systems for enabling parental control settings when an adult is not present within a subscriber premise. Methods, systems, and computer readable media can be operable to facilitate management of parental control settings at one or more devices based upon a detection of a control device. A central device may be configured with one or more device identifiers of one or more devices that are designated as control devices. In response to a determination by the central device that no control device is connected to the central device, the central device may enable one or more parental control settings at the central device and/or one or more client devices. When the central device determines that a control device is connected to the central device, the central device may disable one or more parental control settings at the central device and/or one or more client devices.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   determining one or more device identifiers of one or more client devices that are within a range of a central device;
   determining one or more device identifiers of one or more control devices;
   searching for the one or more device identifiers of the one or more control devices among the one or more device identifiers of the one or more client devices that are within the range of the central device;
   determining that none of the one or more device identifiers of the one or more control devices are found among the one or more device identifiers of the one or more client devices that are within the range of the central device; and
   enabling one or more parental control settings at the central device.

2. The method of claim 1, further comprising:
   identifying a device identifier of a client device from which a communication is received by the central device;
   determining that the device identifier of the client device from which the communication is received matches a device identifier of a control device; and
   disabling one or more parental control settings at the central device.

3. The method of claim 1, further comprising:
   enabling one or more parental control settings at one or more client devices.

4. The method of claim 1, wherein enabling the one or more parental control settings at the central device comprises enabling call blocking.

5. The method of claim 4, wherein call blocking is enabled at a multimedia terminal adapter of the central device.

6. The method of claim 5, wherein the multimedia terminal adapter is configured with one or more trusted numbers that are not blocked while call blocking is enabled at the multimedia terminal adapter.

7. The method of claim 1, wherein the central device is configured with the one or more device identifiers of the one or more control devices.

8. A central device comprising one or more modules that:
   determine one or more device identifiers of one or more client devices that are within a range of the central device;
   determine one or more device identifiers of one or more control devices;
   search for the one or more device identifiers of the one or more control devices among the one or more device identifiers of the one or more client devices that are within the range of the central device;
   determine that none of the one or more device identifiers of the one or more control devices are found among the one or more device identifiers of the one or more client devices that are within the range of the central device; and
   enable one or more parental control settings at the central device.

9. The central device of claim 8, wherein the one or more modules further:
   identify a device identifier of a client device from which a communication is received by the central device;
   determine that the device identifier of the client device from which the communication is received matches a device identifier of a control device; and
   disable one or more parental control settings at the central device.

10. The central device of claim 8, wherein the one or more modules further:
    enable one or more parental control settings at one or more client devices.

11. The central device of claim 8, wherein enabling the one or more parental control settings at the central device comprises enabling call blocking.

12. The central device of claim 11, wherein call blocking is enabled at a multimedia terminal adapter of the central device.

13. The central device of claim 12, wherein the multimedia terminal adapter is configured with one or more trusted numbers that are not blocked while call blocking is enabled at the multimedia terminal adapter.

14. One or more non-transitory computer readable media having instructions operable to cause one or more processors to perform the operations comprising:
    determining one or more device identifiers of one or more client devices that are within a range of a central device;
    determining one or more device identifiers of one or more control devices;
    searching for the one or more device identifiers of the one or more control devices among the one or more device identifiers of the one or more client devices that are within the range of the central device;
    determining that none of the one or more device identifiers of the one or more control devices are found among the one or more device identifiers of the one or more client devices that are within the range of the central device; and
    enabling one or more parental control settings at the central device.

15. The one or more non-transitory computer-readable media of claim 14, wherein the instructions are further operable to cause the one or more processors to perform the operations comprising:
    identifying a device identifier of a client device from which a communication is received by the central device;
    determining that the device identifier of the client device from which the communication is received matches a device identifier of a control device; and
    disabling one or more parental control settings at the central device.

16. The one or more non-transitory computer-readable media of claim 14, wherein the instructions are further operable to cause the one or more processors to perform the operations comprising:
    enabling one or more parental control settings at one or more client devices.

17. The one or more non-transitory computer-readable media of claim 14, wherein enabling the one or more parental control settings at the central device comprises enabling call blocking.

18. The one or more non-transitory computer-readable media of claim 17, wherein call blocking is enabled at a multimedia terminal adapter of the central device.

19. The one or more non-transitory computer-readable media of claim 18, wherein the multimedia terminal adapter is configured with one or more trusted numbers that are not blocked while call blocking is enabled at the multimedia terminal adapter.

20. The one or more non-transitory computer-readable media of claim 14, wherein the central device is configured with the one or more device identifiers of the one or more control devices.

\* \* \* \* \*